United States Patent Office 3,510,935

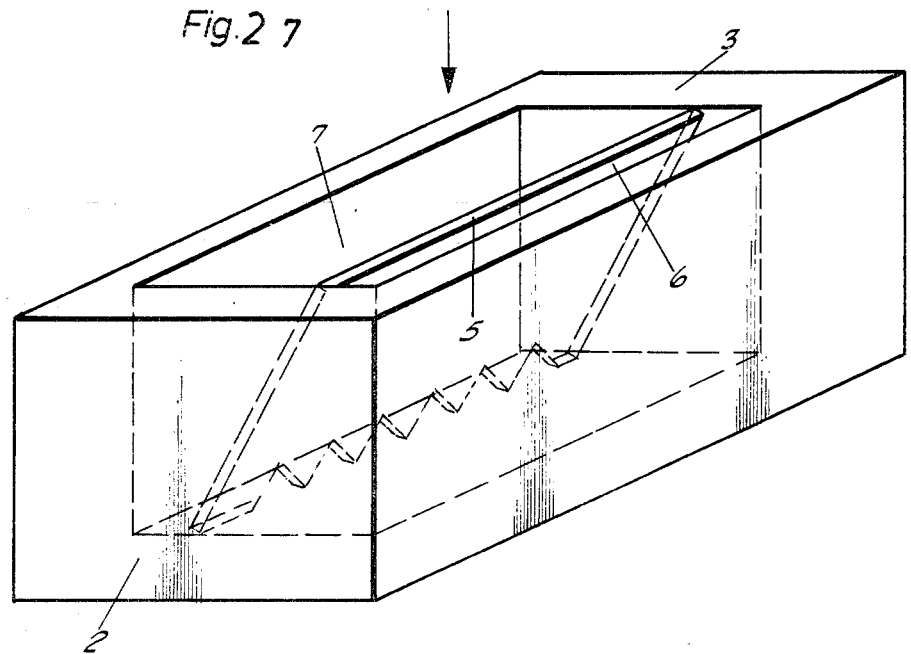
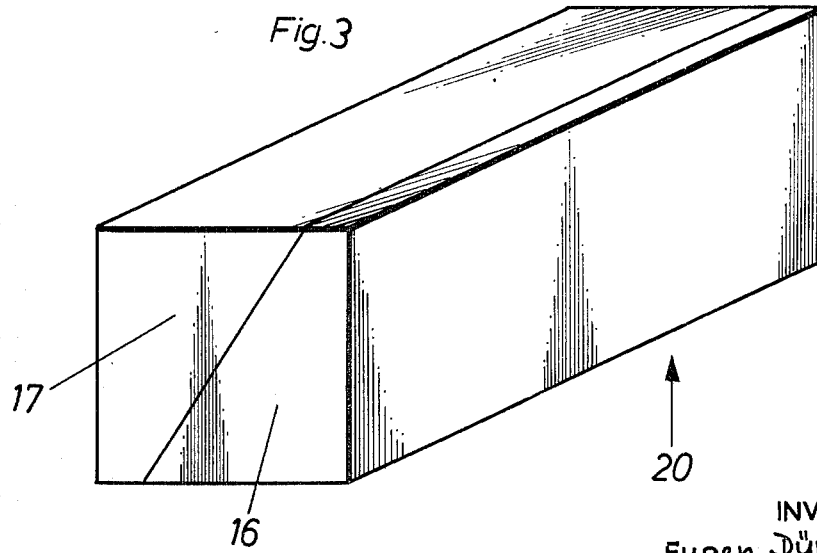

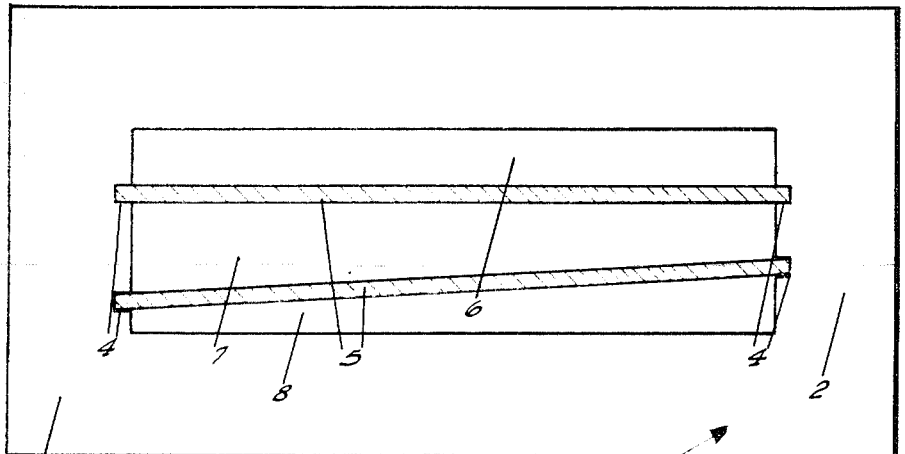
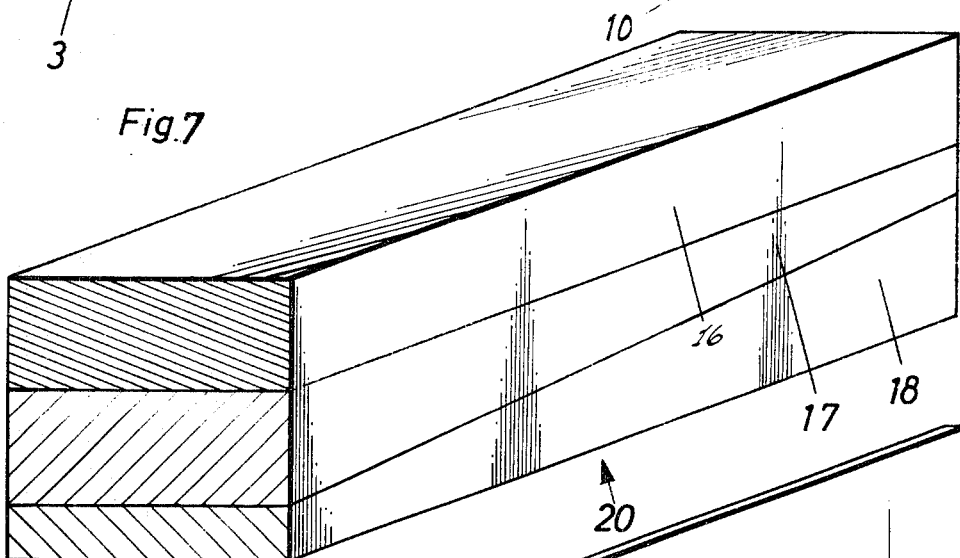
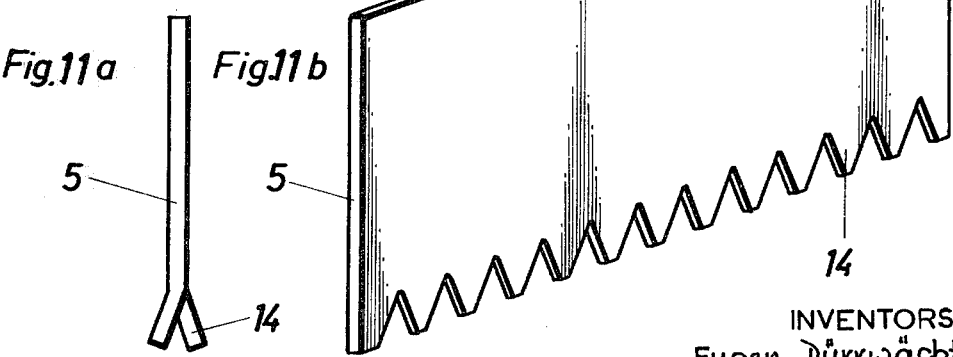

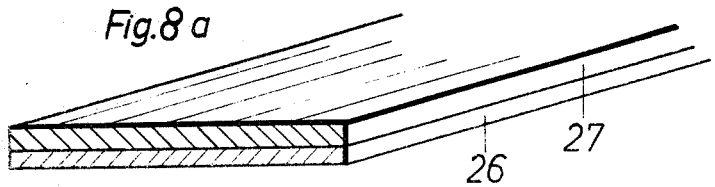
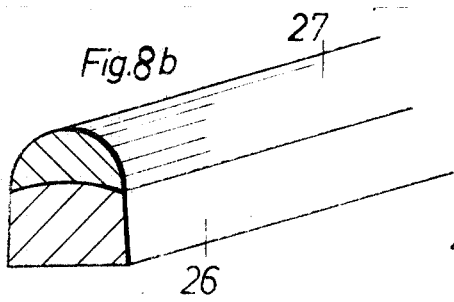 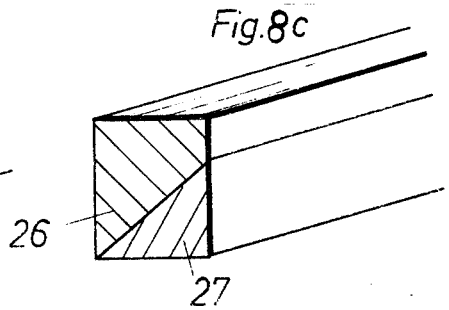
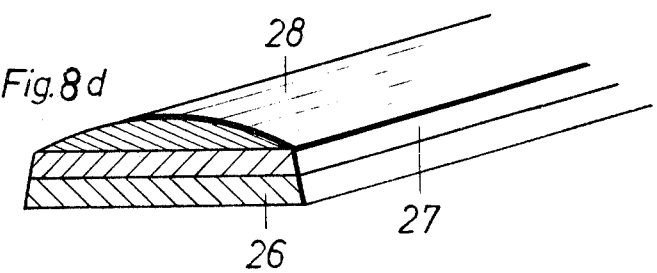
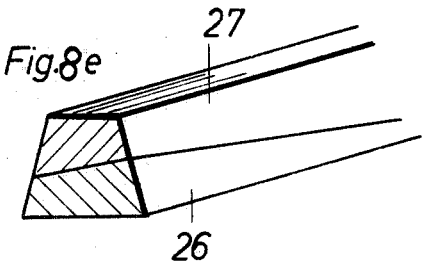 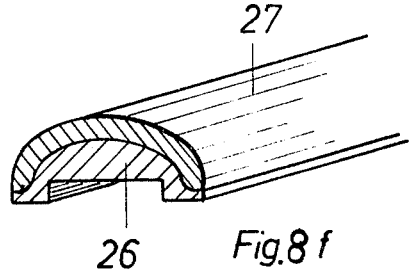

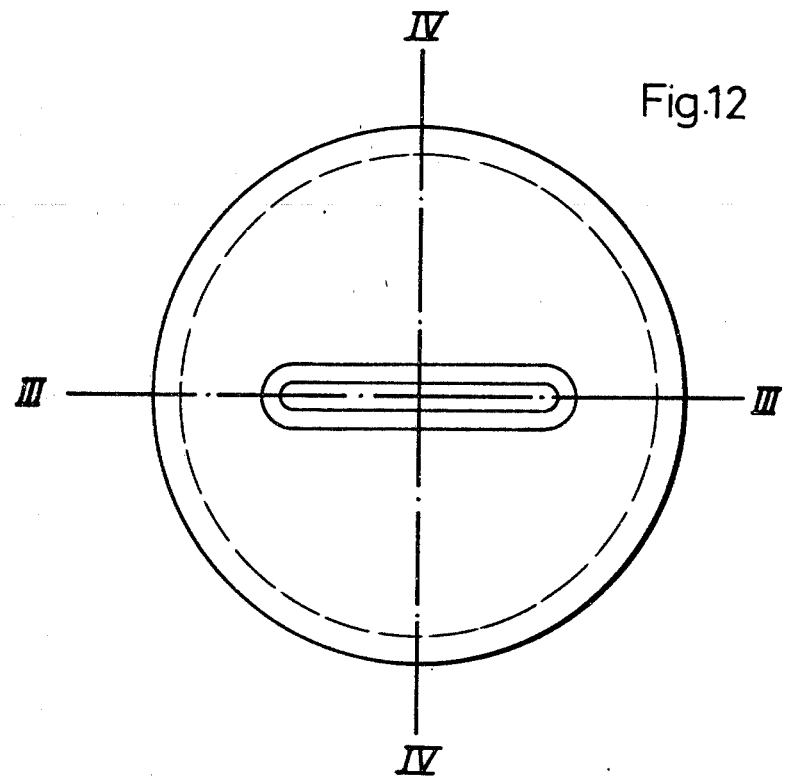
Fig.12
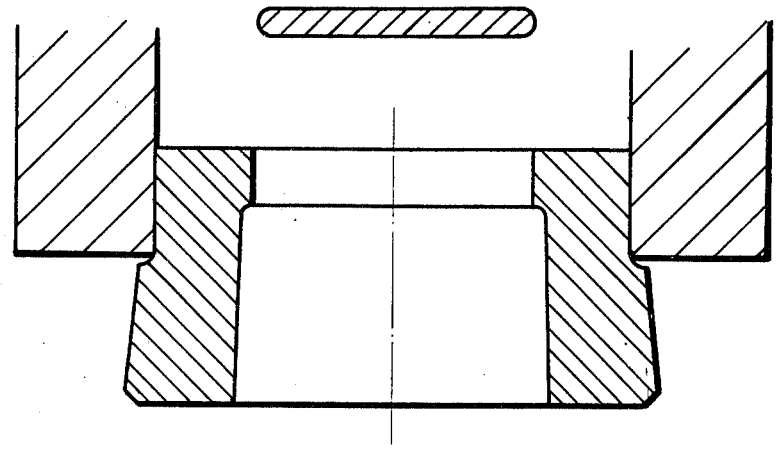
Fig.13
Fig.14
INVENTORS:
Eugen Dürrwächter
Ulf Harmsen
Carl-Ludwig Meyer
Wolfgang Pöttken
By: Spencer & Kaye
Attorneys

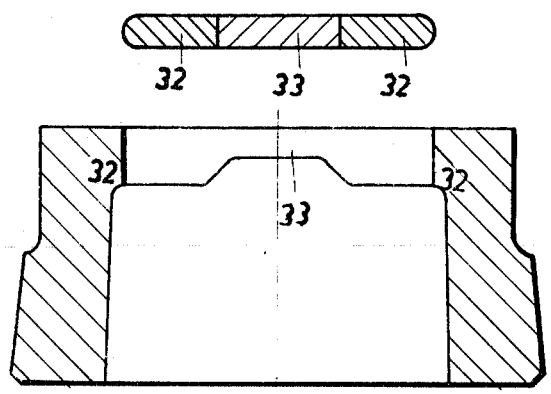
Fig.21
Fig.20
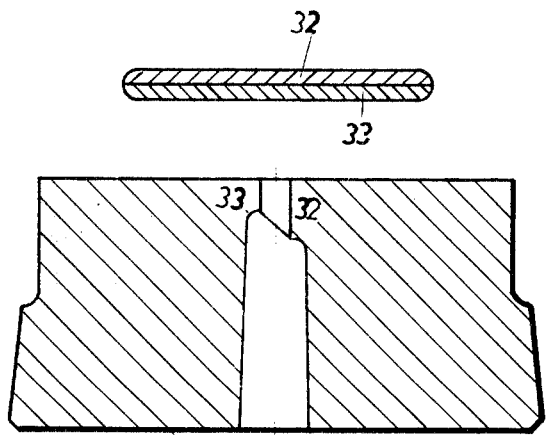
Fig.23
Fig.22
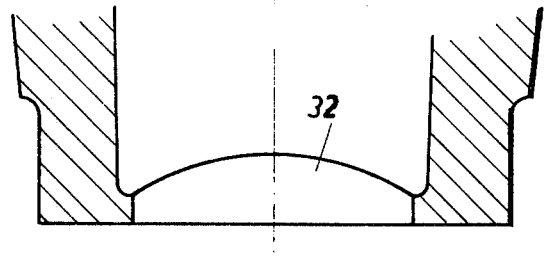
Fig.24 ated May 12, 1970

3,510,935
PROCESS OF MANUFACTURING ROD-SHAPED MULTILAYER SEMIFINISHED MATERIAL
Eugen Dürrwächter, Carl-Ludwig Meyer, Ulf Harmsen, and Wolfgang Pöttken, Pforzheim, Germany, assignors to Eugen Durrwachter Doduco, Pforzheim, Germany
Filed May 3, 1966, Ser. No. 547,282
Claims priority, application Germany, Jan. 3, 1966, D 49,065, D 49,066, D 49,067
Int. Cl. B22f 3/24
U.S. Cl. 29—420.5
12 Claims

ABSTRACT OF THE DISCLOSURE

Process of manufacturing multilayer extrusions wherein a multilayer, compacted block is formed by compacting a powder mixture of metal particles adapted for cold-bonding under pressure and a compound which tends to chemically decompose at an elevated temperature. The compacted block is then sintered at a temperature at which such compound decomposes. Subsequently, the sintered block is extruded in the direction of its layer.

BACKGROUND OF THE INVENTION

This invention relates to a rod-shaped multilayer semifinished material comprising one or more layers of composite material, and to a process and apparatus for manufacturing such material by powder-metallurgical methods.

Multilayer semifinished material in the form of profiled rods and strips is used in the electrical industry for the manufacture of contact pieces, into which the rods or strips are divided.

In many cases, the requirements to be met by the materials for such contact pieces as regards electrical and mechanical wear resistance when used in applications involving high currents and voltages are often so high that these requirements cannot be fulfilled with pure metals or alloys. For this reason, composite materials of heavy metals, such as silver and copper, rare metals, such as tungsten and molybdenum, and their oxides, carbides, borides and sulfides, are being used to an increasing extent as contact materials rather than pure metals or alloys. A composite of silver and cadmium oxide has proved particularly suitable for such contact pieces. In addition to purely metallic materials and composite materials consisting of a metal and a metal oxide, metal-metalloid composite materials have also been used for contact pieces.

These materials are made by powder metallurgy. They are introduced in the form of a powder or a powder mixture into a die, in which they are compacted by pressure and then sintered by heating. For this reason such materials are also described as sintered materials. Such contact materials are brittle and even after repeated compacting and sintering are not entirely free of pores. For this reason the metallic bond is often inadequate so that the contacts tend to be consumed at a high rate under the action of an electric arc.

Contact materials which contain admixtures that prevent welding between contacts obviously cannot be properly welded or soldered to the contact carrier. In such cases it is known to provide a solderable layer, in most cases of pure silver or pure copper, before the individual contact plates are pressed, and to join this layer to the rest of the contact plates by the pressing and sintering treatments.

A large part of the contact materials which have been described can be shaped to such an extent that the sintered blocks can be formed into sheets or other ductile semifinished materials by hot and cold rolling, particularly if the second component has been added only in relatively small amounts. This practice enables a much better metallic bond as well as a perfect freedom of pores and consequently an improved electrical wear resistance. So far, however, the use of materials made by such processes has been restricted to parts which are made with strictly mechanical joints, such as riveted, screwed or clamped joints etc. Such joints are not sufficient for large, high-duty switching equipment. Contacts which have large surfaces and are intended for extremely heavy loads must be secured by welding or soldering, as a rule. With the above-mentioned composite materials, a special, solderable layer is required for this purpose in most cases. As it was previously possible to manufacture such multilayer materials only in the brittle and porous form which has been described hereinbefore, the advantages of sintered contact materials have not been fully available in most cases.

In connection with Ag-CdO, which is the most important material for contacts in switching equipment for low voltages, the above considerations have caused the sintering process to be increasingly superseded by an internal oxidation process, in which a ductile Ag-Cd alloy is transformed by prolonged annealing into Ag-CdO. Many processes are known for providing such internally oxidized materials with a solderable layer.

So far, Ag-CdO materials made by these processes have been predominant on the market in spite of various disadvantages, such as brittleness caused by an enriching of CdO at the grain boundaries. Powder-metallurgical methods of manufacture have not re-gained importance until more ductile semi-finished materials were provided, which are produced from large blocks by rolling, extruding or drawing. As these powder-metallurgical products had to be secured by mechanical means, their use was restricted to relatively small equipment.

SUMMARY OF THE INVENTION

It is an object of the invention to provide a sintered semifinished material which is ductile and perfectly free of pores and comprises a firmly adherent layer which can be soldered with good results. Former attempts to subsequently apply such well solderable layers by pressure welding (pressure bonding) or roll cladding (roll bonding) have not resulted in a joint of sufficient strength.

The process according to the invention enables the manufacture of a sintered, ductile composite material which is free of pores and provided with a firmly adhering layer, which can be soldered with good results.

A contact piece which is made according to the invention from a rod-shaped multilayer semifinished material is characterized in that the semifinished material is extruded from a multilayer block in the direction of its layers, which has been made by powder-metallurgical methods and at least one outer layer consists of sintered material.

It has surprisingly been found that the extruding of the sintered material eliminates the above-mentioned brittleness of the material and transforms the same into a ductile material. This ductility is probably due to the oriented fibrous structure, which is imparted to any extruded material.

If an outer layer of silver or copper is provided, the finished contact piece can easily be soldered to the contact carrier. It is also possible to provide an inner layer of silver or copper and to divide the semifinished materials or the contact piece in the direction of its axis.

Thus, the above-mentioned difficulties are eliminated in the contact piece according to the invention. In the manufacture of the multilayer semifinished material, a multilayer block is initially made from powders or powder mixtures by compacting and subsequent sintering. This block is then shaped by an extruder into a multilayer extrusion.

In the manufacture of the block, which has preferably the shape of a rectangular prism, by powder-metallurgical methods in the practice of the invention, the various powders or powder mixtures are charged into an upright compacting die, which is divided by partitions. The die is then vibrated, the partitions are removed and the powders are compacted in the die to form the block. If a horizontal die is used, the different powders which form the various layers may be charged in succession without partitions.

The density of sintered bodies depends to a high degree on the sintering temperature. It might be generally believed that higher sintering temperatures result in a higher sintered density. This is not the case, however, with soft silver powder, because the density of sintered silver decreases with higher sintering temperatures. This effect is ascribed to the fact that silver and some silver alloys can undergo cold bonding so that the gases which are trapped in closed pores during compacting cannot escape during the sintering operation and tend to expand the compact.

Whereas it has already been proposed to use pure thermally decomposable silver compounds alone, such as silver carbonate or silver oxide, rather than pure silver, the examples stated in the respective printed publications have proved to be impracticable. Owing to the spontaneous evolution of gases, the heating of composite bodies of a commercially useful size, which consisted of silver carbonate or silver oxide rather than of pure silver, resulted in disintegration, partly in the manner of an explosion.

It has surprisingly been found that in the manufacture of sintered composite materials by powder-metallurgical methods, mixtures of silver with silver compounds, which are chemically decomposable at elevated temperatures have neither the disadvantages of pure silver nor those of pure silver carbonate or pure silver oxide. Suitable admixtures of this kind include all gas-evolving, thermally decomposable silver compounds, provided that they do not produce explosive mixtures and disintegrate below the usual sintering temperature range. These compounds include silver carbonate, silver oxide, as well as, e.g., silver acetate, silver nitrite and silver oxalate.

In the manufacture of a compact, the addition of such silver compounds to pure silver reduces the cold bonding of the silver particles and consequently the formation of pores as well as the trapping of gas. The resulting compact does not exhibit inflation and blistering. As silver carbonate is decomposed at temperatures as low as 218° into $CO_2$ and $Ag_2O$ and the latter is decomposed into $O_2$ and Ag, the gaseous constituents can escape before the compacts are sintered and consolidated.

Investigations of the apparent void ratio, which is defined as the ratio of the open void volume of a body to the volume of the body in percent of the latter, have shown that $Ag-Ag_2CO_3$ sintered bodies are still highly porous and capable of discharging gases under an applied pressure of more than 4000 kg./sq. cm. whereas an Ag body loses its apparent porosity at 1600 kg./sq. cm. and then tends to become inflated. The effect of the addition of silver carbonate is thus due to the fact that silver carbonate is decomposed at a relatively low temperature and leaves a porous skeleton, from which most of the gases can escape during the further sintering treatment.

BRIEF DESCRIPTION OF THE DRAWINGS

FIG. 2 shows a compacting die for the manufacture of a block as shown in

FIG. 3, before the charging of the powder.

FIG. 4 shows a compacting die for the manufacture of a block as shown in

FIG. 6 shows a compacting die for the manufacture of a block as shown in

FIG. 7, before the charging of the powder.

FIGS. 8a–f show rod-shaped semifinished materials made by extrusion from sintered blocks.

FIG. 9 shows a contact piece which has been cut from an extruded rod-shaped semifinished material.

FIGS. 11a and 11b show a partition.

FIG. 12 is a front elevation showing a known extrusion die.

FIG. 13 is a transverse sectional view showing a strip-like extrusion made with the aid of the die shown in FIG. 12.

FIG. 14 is a sectional view taken on line III—III of FIG. 12 and showing the die and the adjacent part of the receiver.

FIG. 20 is a sectional view similar to FIG. 16 and shows a die which is designed according to the invention for producing an extrusion as shown in FIG. 21.

FIG. 22 is a sectional view similar to FIG. 15 and shows a die which is designed according to the invention for producing an extrusion as shown in FIG. 23.

FIG. 24 shows both sides of a section taken as in FIG. 16.

DETAILED DESCRIPTION OF PREFERRED METHOD

Figure 1:
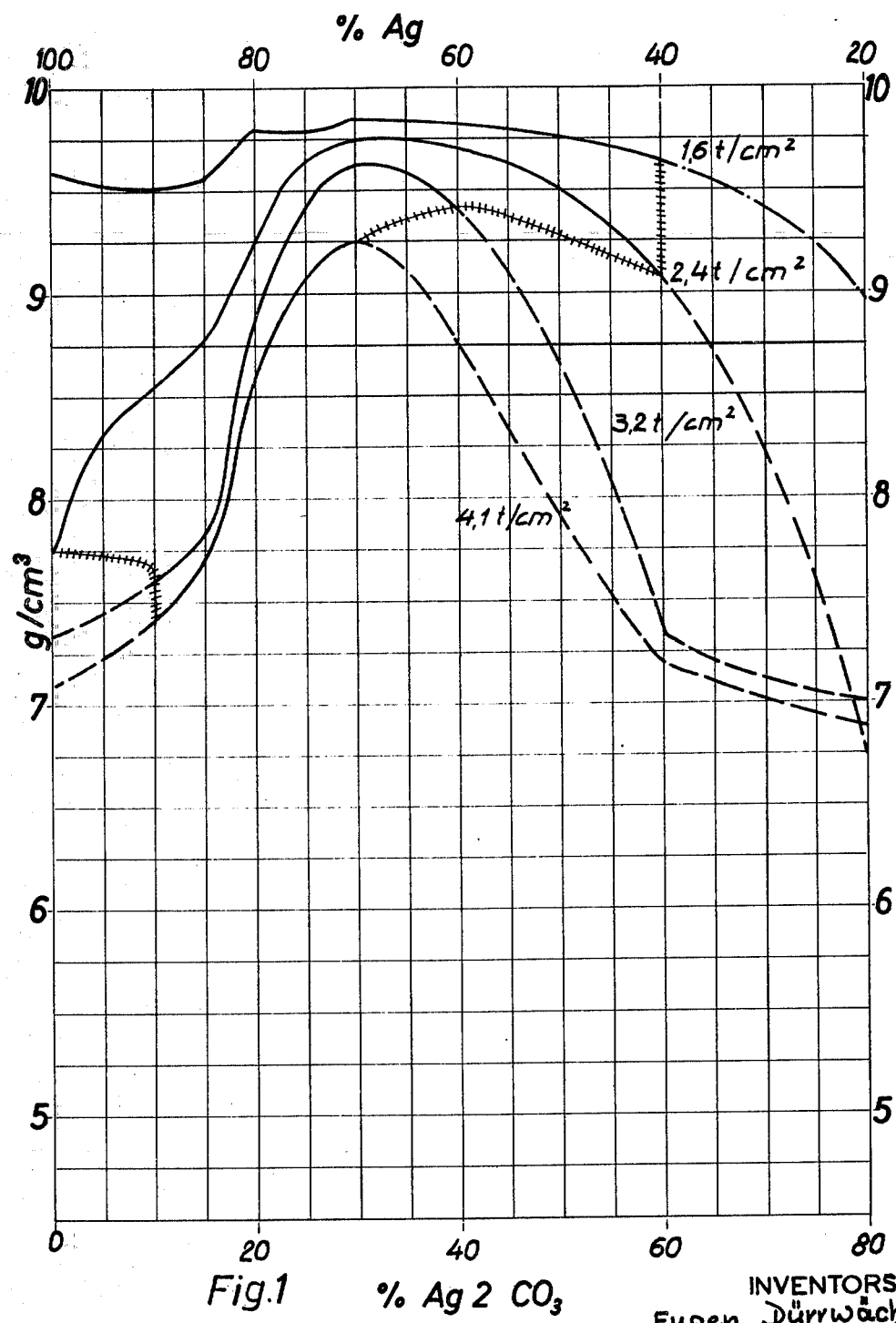
FIG. 1 is a graph which indicates the density of a sintered body as a function of the addition of $Ag_2CO_3$ in percent to silver for various compacting pressures and for a sintering treatment carried out in air at 900° C. for two hours.
Figure 4:
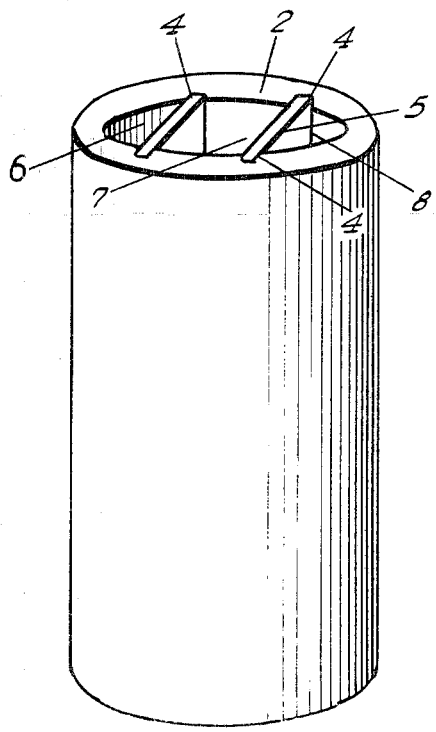
Figure 5:
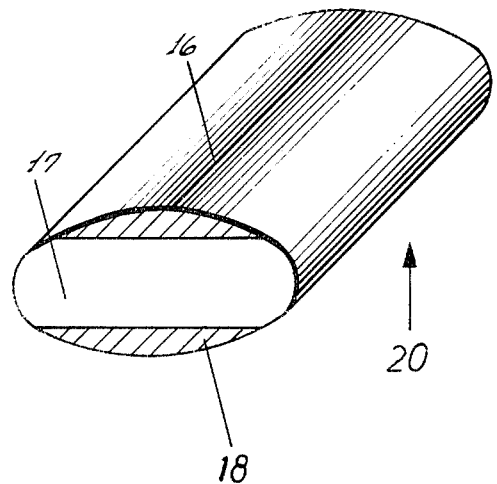
FIG. 5, before the charging of the powder.
Figure 10:
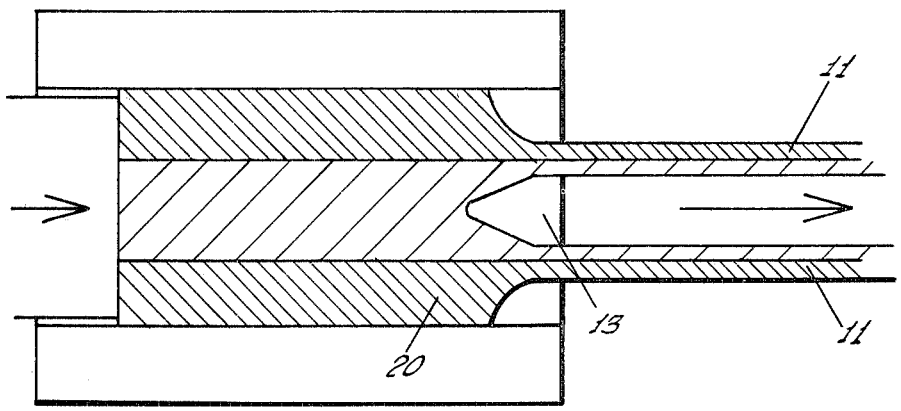
FIG. 10 is a longitudinal sectional view of the die portion of an extruder during the production of two extrusions from one block.
Figure 15:
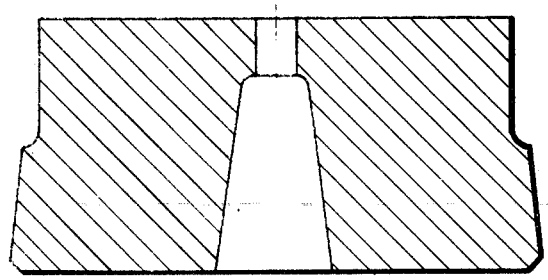
FIG. 15 is a sectional view taken on line IV—IV of FIG. 12 and shows the die without the receiver.
Figure 17:
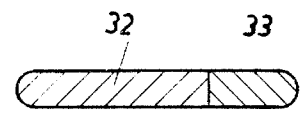
Figure 16:
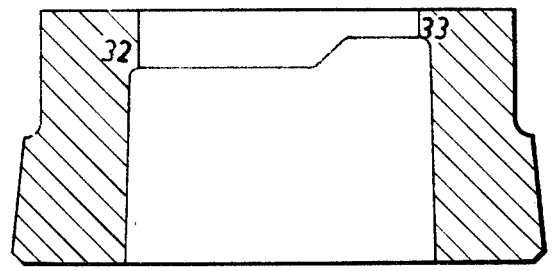
FIG. 16 is a sectional view similar to FIG. 14 but without the receiver and shows a die which is designed according to the invention for producing an extrusion as shown in FIG. 17.
Figure 19:
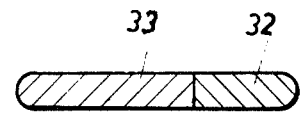
Figure 18:
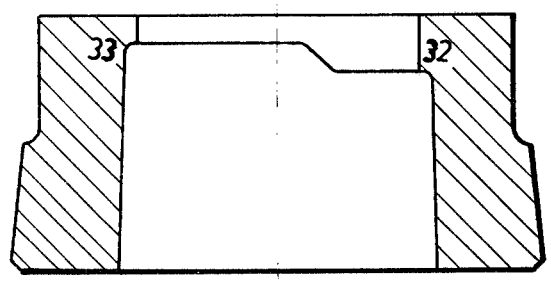
FIG. 18 is a sectional view similar to FIG. 16 and shows a die which is designed according to the invention for producing an extrusion as shown in FIG. 19.
Figure 26:
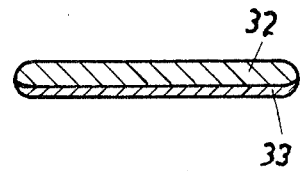
Figure 25:
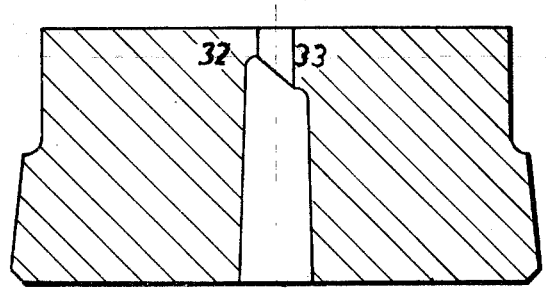
FIG. 25 is a sectional view similar to FIG. 15 and shows a die which is designed according to the invention for producing an extrusion as shown in FIG. 26.
Figure 27:
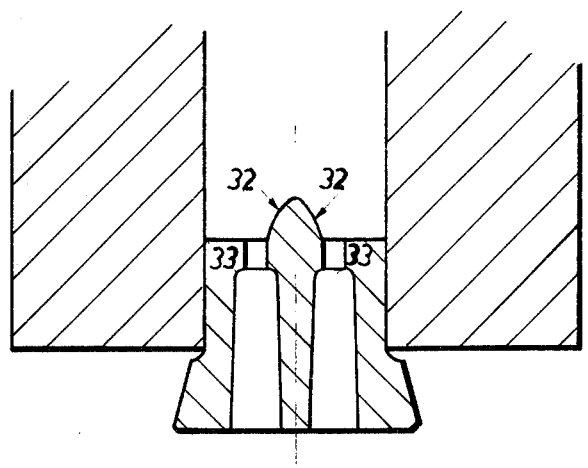
FIG. 27 is a sectional view showing a die and the adjacent portion of the receiver, with two extruding passages for producing two-layer extrusions from a three-layer block, which is shown in FIG. 28 in a longitudinal sectional view.
Figure 28:
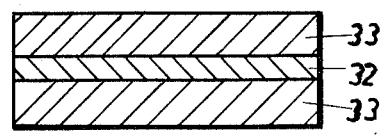

With reference to FIG. 1, the maximum density of the sintered product is obtained for all compacting pressures with a 70:30 mixing ratio of Ag and $Ag_2CO_3$. The dotted lines indicate blistering. The dash-and-dot lines indicate a formation of cracks in the sintered body. The cross-hatched line indicates the limit for the formation of blisters and cracks. With the aid of this graph, a certain density of the sintered body can be predetermined for each compacting pressure within a certain range of the mixing ratio of silver and silver carbonate.

It is distinctly apparent that the use of 100% $Ag_2CO_3$ will not result in a higher sintered density than the use of Ag because the spontaneous evolution of gas will burst the compacts.

Corresponding graphs may be developed for other composite materials which contain silver and thermally decomposable silver compounds.

This process enables a manufacture of composite bodies, which contain silver and other powders and which have an optimum or predetermined sintered density owing to the use of chemically decomposable silver compounds.

In the manufacture of multilayer compacts it is important, e.g., that the various layers have the same shrinkage during sintering so that stresses in the multilayer block are avoided. Such an equal shrinkage of the layers may be obtained by adding different amounts of silver compounds which decompose at elevated temperatures to the powders which form the various layers. The amount of the decomposable silver compound in percent will depend in such cases on the desired volumetric shrinkage of the sintered body in percent.

The same effect can be achieved with composite materials consisting of more than two components provided that the compound which can be thermally decomposed with evolution of gas is a chemical compound of one or more of the components other than silver which are included.

It is known that there is an optimum temperature range for the extruding of each material and this range depends on the flow behavior of the material. It will be understood that there is generally no such range for a multilayer block which is composed of different materials. In order to avoid the use of glass lubrication, which is detrimental, or of an expensive indirect extruder, the die which is used in the process according to the invention is provided with bearing or snubbing surfaces for that layer-forming material which is more fluid at the desired extrusion temperature.

To restrain the flow of the middle parts of extrusions which have a very large width in relation to their height, it is known to provide the extrusion die with a bearing or contact surface which is longer in the middle than at the edges. This design prevents an advance of the middle part of the extrusion relative to the side edges because such an advance would ultimately cause a longitudinal splitting of the extrusion.

In the extrusion die according to the invention, the bearing or snubbing surfaces are designed with a view not only to the sectional shape of the extrusion but also to the flow behavior of the metals forming the layers of the block. Hence, the extrusion channel of the die according to the invention is basically different in its design in general from the extrusion channel of the known die.

In extruding multilayer blocks, it has been conventional to effect a preferential extrusion first of the inner layers and subsequently of the outer layers. As a result, the thickness of the layers varied over the length of the semifinished material so that the contact pieces made from the semifinished material were not identical. Whereas this disadvantage can be avoided by indirect extrusion processes, indirect extruders are highly expensive. For this reason, a cast multilayer block has been provided, in which the layers were designed with such a variation in thickness that the thickness of the layers in a semifinished material produced from such block with the aid of a normal (direct) extruder remains constant throughout the length of the extrusion.

When a block having between its layers an interface which slopes in the axial direction is formed in the process according to the invention, the side walls of an upright compacting die are provided according to another feature of the invention with grooves for guiding the partitions and for locating the partitions so as to obtain the desired variation of the thickness of the layers in the finished block.

According to the invention, that edge of each partition which is at the bottom during the charging of the powder is serrated, canted or roughened. This causes a mixing of the powder layers in the portions which adjoin both sides of the partition when the same is being pulled out of the powder while the same is still loose so that an interlayer is formed with a gradual transition between the powders. As a result, the layers are merged after compacting and sintering and form a bond of eminent strength.

With reference to FIGS. 2 to 28 of the drawings, the side wall 2 and 3 of the compacting die 10 are formed with grooves 4, which receive partitions 5, which define compartments 6, 7, 8.

Different powders are charged into these compartments and may be vibrated. The partitions 5 are then pulled out and the powders are compacted to form a block 20.

The lower edge 14 of the partition 5 terminates in lugs, which are canted or set like saw teeth. Alternatively, the edge 14 may be formed with other projections or may be otherwise formed so as to intermix the powders separated by the partitions when the partition 5 is being removed. This results in the formation of a transition zone between the powder layers.

The block may be circular, elliptic, triangular or polygonal in cross-section. The most desirable form of the block is that of a prism of square cross-section (FIG. 3). The layers 16, 17, 18 of the block correspond to the compartments 6, 7 and 8 of the compacting die. The thickness of the layers has such a calculated variation over the length of the block in that the layers 26, 27 and 28 of the semifinished material 30 (FIGS. 8a–f) have a uniform thickness throughout their length or a thickness which varies in a desired manner throughout their length (FIG. 8e). All contact pieces 40 (FIG. 9) which have been cut from a semifinished material having layers of uniform thickness are identical.

The contact layer 40 has usually two layers, namely, at one outside surface a layer of contact material, such as a composite material of silver and cadmium oxide, and on the other outside surface a layer of a solderable material, such as silver or copper. A contact piece has layers of contact material on both outside surfaces and an intermediate layer of solderable material may be divided at it center. As is apparent from FIG. 10, a three-layer block 20 may be extruded in the direction of its layers through a die 13 having two orifices to obtain two two-layer extrusions 11.

In the drawings, the portions which form the bearing or snubbing surface of the extrusion channels of the die are shown in solid gray. The material which flows more easily is indicated at 32 and the material which is less fluid is designated 33.

Example 1

A powder mixture consisting of 70% pure silver and 30% silver carbonate is compacted under a pressure of 4000 kg./sq. cm. to form a solid having a compacted density of 7.4 grams per cubic centimeter. This compact is slowly heated in air to 900° C. and is held at this temperature for two hours. This treatment results in a sintered body having a density of 9.3 grams per cubic centimeter. The body has no cracks and is entirely suitable for further processing, e.g., in the manufacture of contact pieces.

A corresponding body of pure silver has a compacted density of 9.5 grams per cubic centimeter and a sintered density of only 7.1 grams per cubic centimeter. The body is inflated, formed with blisters and entirely unsuitable.

Example 2

A powder mixture consisting of 65% pure silver, 5% graphite and 30% silver carbonate is compacted under a pressure of 1.6 kg./sk. cm. and sintered in inert gas at 900° C. for two hours. The sintered compact has a density of 7.3 grams per cubic centimeter. It is also free of cracks and suitable for further processing.

Example 3

A powder mixture of 86.6% silver and 13.4% cadmium carbonate is compacted under a pressure of 3 kg./sq. cm. to form a solid, which is heated in air at 900° C. for two hours. This results in a composite material, which consists of 90% silver and 10% cadmium oxide and after a further compacting is eminently suitable as a contact material.

Whereas the use of cadmium carbonate for the manufacture of a highly homogeneous mixture with silver powder was known, it was not known that this addition results in a powder which can be formed into compacts which during a subsequent sintering treatment do not form cracks or blisters and the compacting pressures applied to obtain such compacts may be much higher than those which are permissible in compacting mixtures of cadmium oxide powder and silver powder.

Example 4

The following components are charged into separate compartments of an upright compacting die, which compartments are separated by a partition:
(A) A mixture of 85% silver and 15% silver carbonate;
(B) A mixture of 80% pure silver, 10% silver carbonate (AgCO$_3$) and 10% zinc oxide (ZnO).

The partition is then removed and the powders are compacted under a pressure of 2000 kg./sg. cm. to form a two-layer block, which is then sintered in an oxidizing atmosphere at 920° C. for three hours. During sintering, both layers shrink by the same amount. The resulting two-layer block has a high density and is suitable for further processing.

Without the addition of silver carbonate, the sliver layer would crack and blister.

When satisfactory blocks of sintered materials have thus been formed, these blocks are placed into the receiver of an extruder and are then extruded.

The extruding of sintered materials must be carried out in most cases in the absence of atmospheric oxygen. To exclude oxygen, compacting may be carried out in an atmosphere of a protective gas, such as nitrogen.

Example 5

An upright rectangular compacting die which is divided by a partition extending in the longitudinal direction of the rectangle is charged on one side of the partition with pure silver powder and on the other side with a mixture of 90% silver powder and 10% cadmium oxide (CdO) powder and is then vibrated. Thereafter the partition is pulled out of the die and the powder in the die is compacted to form a block which is approximately square in cross-section. This block is subsequently heated slowly to the sintering temperature of about 900° C. and is thereafter sintered for two hours and from the sintering furnace is directly introduced into the receiver of a horizontal extruder.

The block is extruded to form a rectangular prismatic extrusion having a cross-section of about 5 mm. x 80 mm. This extrusion consists in about ⅓ of its thickness of pure silver, balance 90% Ag and 10% CdO. This extrusion is further processed in the usual manner and used for the manufacture of contact pieces, which can be well soldered on one side.

Example 6

An upright compacting die is used which is round in cross-section and provided with two partitions. The intermediate compartment between the two partitions is charged with a mixture of 90% silver powder, 5% zinc oxide powder and 5% cadmium oxide powder. The two outer compartments are charged with a powder mixture consisting of 70% pure silver and 30% silver carbonate. The die is then vibrated. Both partitions are pulled and the powder in the die is compacted to form a cylindrical compact block, which is sintered as in Example 5 and then introduced into the receiver of an upright extruder and extruded through a two-orifice die to form two rectangular prismatic metal extrusions having each a cross-section of about 4 mm. x 60 mm. The resulting metal extrusions consist now of pure silver in about 20% of their total thickness, balance Ag-CdO-ZnO.

Example 7

A rectangular compacting die is charged first with a layer of a powder mixture of 85% silver and 15% nickel, then with a second layer of a powder mixture of 97% silver and 3% graphite and is then vibrated. The powder mixtures are compacted in the die to form a square block, which is sintered in a hydrogen atmosphere for three hours at 800° C. and subsequently processed in an extruder to produce a profiled extrusion. This extrusion is generally rectangular and has a rounded top and consists in its lower half of a composite material of 85% Ag and 15% nickel and in its upper part of a composite material of 97% Ag and 3% carbon.

Example 8

A rectangular compacting die is used, which comprises a partition which extends obliquely with respect to the longitudinal walls of the die. Pure copper powder is charged into the narrower compartment. A powder mixture of 80% copper powder and 20% tungsten powder is charged into the wider compartment. The die is then vibrated and the partition is removed. Thereafter, the contents of the die are compacted to form a square block, which is subsequently sintered in a vacuum at 1030° C. for four hours and processed in an extruder having a rectangular receiver to form an upright, trapezoidal-section extrusion, which has a base portion of pure copper and a narrow top portion of a composite material consisting of copper and tungsten.

Example 9

An upright compacting die is used, which has a square base and two inserted partitions. Silver powder is charged into one outer compartment, a mixture of 94% silver, 3% nickel and 3% graphite is charged into the intermediate compartment; a mixture of 80% silver, 15% tungsten and 5% molybdenum carbide is charged into the third compartment. The die is then vibrated. When the partitions have been pulled, the contents of the die are compacted in the longitudinal direction by pressure applied from both sides to form a compacted block of square cross-section. This block is then sintered at 920° in argon and thereafter processed in an extruder having a square receiver to form a flat-section extrusion having three layers.

In all examples, the powder mixtures were as homogeneous as possible. This is promoted by stirring the powders during mixing. The particle size of the powders was 2–3 microns. The vibrating of the compacting dies is controlled to avoid an unmixing of the powder mixtures.

What is claimed is:

1. A process of manufacturing multilayer extrusions, which comprises producing by powder-metallurgical methods a multilayer block having a sintered outer layer and extruding said block in the direction of the layers thereof to obtain a multilayer extrusion; said block being produced by compacting a plurality of layers of different powders to form a compacted block, and sintering said compacted block; said layers being formed by charging said powders into different compartments of a die having at least one removable partition, which separates adjacent compartments, removing said partition, and compacting said layers in said die.

2. A process of manufacturing multilayer extrusions, which comprises producing by powder-metallurgical methods a multilayer block having a sintered outer layer and extruding said block in the direction of the layers thereof to obtain a multilayer extrusion; said block being produced by compacting a plurality of layers of different powders to form a compacted block, and sintering said compacted block; at least one of said powders consisting of a mixture including particles of a metal which is adapted to be cold-bonded under pressure and particles of a compound which tends to decompose at an elevated temperature below the temperature at which said block is sintered, said layers being compacted under pressure.

3. A process as set forth in claim 2, in which said contents of said compound in said powders is controlled to obtain layers having the same shrinkage during the sintering of the compacted block.

4. A process of manufacturing multilayer extrusions, which comprises producing by powder-metallurgical methods a multilayer block having a sintered outer layer and extruding said block in the direction of the layers thereof to obtain a multilayer extrusion; and forming said block with three layers and extruding said block through an extrusion die having two orifices to obtain two two-layer extrusions.

5. A process of manufacturing multilayer extrusions, which comprises producing by powder-metallurgical methods a multilayer block having a sintered outer layer and extruding said block in the direction of the layers thereof to obtain a multilayer extrusion; and forming said block with outer layers of different workability and extruding said block through a die which contacts the outer layer having a relatively higher workability with a larger frictional surface than the outer layer having a relatively lower workability.

6. A process of obtaining a sintered product, which comprises forming a compacted block by compacting under pressure a powder mixture including particles of a metal which is adapted to be cold-bonded under pressure and particles of a compound which tends to chemically decompose at an elevated temperature, and sintering said compacted block at a temperature which is higher than said elevated temperature; said compacted block being formed by compacting under presure said powder mixture and an additional powder mixture forming different layers of said block, the contents of said compounds in said powder mixtures being controlled to obtain layers having the same shrinkage during the sintering of the compacted block.

7. A process as set forth in claim 6, in which said metal is silver and said compound is a silver compound which is schematically decomposable at elevated temperatures.

8. A process of obtaining a sintering product, which comprises forming a compacted block by compacting under pressure a powder mixture including particles of a metal which is adapted to be cold-bonded under pressure and particles of a compound which tends to chemically decompose at an elevated temperature, and sintering said compacted block at a temperature which is higher than said elevated temperature; said metal being silver and said compound being a silver compound which is chemically decomposable at elevated temperatures; said compound being selected from the class consisting of silver acetate, silver nitrate, silver oxalate, silver carbonate, and silver oxide.

9. A process as set forth in claim 8, in which said mixture consists of 70 percent by weight pure silver and 30 percent by weight silver carbonate.

10. A process of obtaining a sintered product, which comprises forming a compacted block by compacting under pressure a powder mixture including particles of a metal which is adapted to be cold-bonded under pressure and particles of a compound which tends to chemically decompose at an elevated temperature, and sintering said compacted block at a temperature which is higher than said elevated temperature; said compound consisting of cadmium carbonate and said compacted block being heated in the presence of oxygen to cause a conversion of said cadmium carbonate to cadmium oxide.

11. A process of manufacturing multilayer contact pieces, which comprises compacting a plurality of layers of different powders to form a compacted block, sintering said compacted block, extruding the sintered block in the direction of the layers thereof to obtain a multilayer extrusion having sintered-bonded layers, and severing multilayer contact pieces having sinter-bonded layers from said extrusion.

12. A process of manufacturing multilayer contact pieces, which comprises producing by powder-metallurgical methods a block having a layer of solderable metal and at least one layer of a composite material of metal and metal oxide, said block having at least one sintered outer layer, extruding the sintered block in the direction of the layers thereof to obtain a multilayer extrusion, and severing multilayer contact pieces from said extrusion.

References Cited
UNITED STATES PATENTS

| | | | |
|---|---|---|---|
| 2,331,909 | 10/1943 | Hensen et al. | 75—208 X |
| 2,466,432 | 4/1949 | Jenkins | 75—208 X |
| 2,913,819 | 11/1959 | Androetti | 75—208 X |
| 3,010,196 | 11/1961 | Smith et al. | |
| 3,191,272 | 6/1965 | Gwyn | 29—630 |
| 3,199,176 | 8/1965 | Freudiger et al. | 29—630 |
| 3,317,991 | 5/1967 | Haarbye | 29—420.5 |
| 3,331,962 | 7/1967 | Kuhl | 29—420.5 X |
| 2,359,622 | 12/1967 | Meyer et al. | 29—420.5 |

PAUL M. COHEN, Primary Examiner

U.S. Cl. X.R.

29—182.2, 630; 75—208